United States Patent
Nakamura et al.

(10) Patent No.: US 7,564,435 B2
(45) Date of Patent: Jul. 21, 2009

(54) LIQUID CRYSTAL PROJECTOR COOLING SYSTEM DEPENDENT ON AIR PRESSURE AND TEMPERATURE VARIABLES

(75) Inventors: Hisashi Nakamura, Kobe (JP); Kouji Terami, Higashiosaka (JP); Toshiyuki Okino, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1633 days.

(21) Appl. No.: 10/073,959

(22) Filed: Feb. 14, 2002

(65) Prior Publication Data

US 2002/0118160 A1    Aug. 29, 2002

(30) Foreign Application Priority Data

Feb. 27, 2001    (JP)    ............... 2001-053014

(51) Int. Cl.
G09G 3/36    (2006.01)
G03B 21/16    (2006.01)
(52) U.S. Cl. ......................... 345/87; 353/52
(58) Field of Classification Search ............. 353/52–61; 345/87–111
See application file for complete search history.

(56) References Cited

U.S. PATENT DOCUMENTS 6,322,218 B1 *    11/2001    Sugawara et al. ............. 353/52

FOREIGN PATENT DOCUMENTS

JP    2000-194072    7/2000

OTHER PUBLICATIONS

English Translation of Notice of Rejected dated Aug. 17, 2004 from Japanese Patent Office for Japanese Application No. JP 2001-053014.

* cited by examiner

Primary Examiner—Richard Hjerpe
Assistant Examiner—Srilakshmi K Kumar
(74) Attorney, Agent, or Firm—Westerman, Hattori, Daniels & Adrian, LLP.

(57) ABSTRACT

A liquid crystal projector provided with a cooling fan comprises a temperature sensor for detecting the internal temperature of the liquid crystal projector, an air pressure sensor for detecting outside air pressure, and a control device for controlling the number of revolutions of the cooling fan on the basis of the temperature detected by the temperature sensor and the outside air pressure detected by the air pressure sensor.

2 Claims, 3 Drawing Sheets

LIQUID CRYSTAL PROJECTOR COOLING SYSTEM DEPENDENT ON AIR PRESSURE AND TEMPERATURE VARIABLES

BACKGROUND OF THE INVENTION

1. Field of the Invention

The present invention relates to a liquid crystal projector.

2. Description of the Prior Art

In liquid crystal projectors, a liquid crystal panel, a light source lamp for backlight arranged on a rear surface of the liquid crystal panel, a signal processing circuit, and a power supply circuit are provided in a casing. Conventionally in the liquid crystal projectors, air cooling is performed by a cooling fan in order to restrain the rise in the temperature in the casing. Further, techniques for controlling the number of revolutions of the cooling fan have been developed on the basis of the temperature detected by a temperature sensor arranged in the casing in order to save energy and reduce noise by the cooing fan.

In methods of controlling the number of revolutions of the cooling fan on the basis of only the detected temperature, however, the cooling efficiency by the cooling fan is lowered in areas where air density is low, such as areas where air pressure is low, for example, highlands.

Liquid crystal projectors so adapted that two types of control tables for flatlands and highlands are prepared as a control table representing the relationship between a temperature and a control value of a cooling fan, and a user performs setting as to which of the control tables should be used have been developed. In such a liquid crystal projector, however, it is necessary for a user to perform a setting operation depending on an area where the liquid crystal projector is employed.

SUMMARY OF THE INVENTION

An object of the present invention is to provide a liquid crystal projector in which suitable control of a cooling fan is automatically carried out depending on air pressure in an area where the liquid crystal projector is employed.

In a liquid crystal projector provided with a cooling fan, a liquid crystal projector according to the present invention is characterized by comprising a temperature sensor for detecting the internal temperature of the liquid crystal projector; an air pressure sensor for detecting outside air pressure; and a control device for controlling the number of revolutions of the cooling fan on the basis of the temperature detected by the temperature sensor and the outside air pressure detected by the air pressure sensor.

An example of the control device is one comprising a driving circuit of the cooling fan, storage means for storing a control table representing the relationship between the temperature detected by the temperature sensor and the value of a control voltage for the driving circuit of the cooling fan for each of a plurality of classes into which the outside air pressure is divided, and means for determining the value of the control voltage for the driving circuit of the cooling fan on the basis of the control table corresponding to the class to which the outside air pressure detected by the air pressure sensor belongs and the temperature detected by the temperature sensor and outputting a voltage signal corresponding to the determined control voltage value to the driving circuit of the cooling fan.

An example of the control device is one comprising a driving circuit of the cooling fan, a storage device for storing a control table representing the relationship between the temperature detected by the temperature sensor and the value of a control voltage for the driving circuit of the cooling fan for each of a plurality of classes into which the outside air pressure is divided, and a circuit for determining the value of the control voltage for the driving circuit of the cooling fan on the basis of the control table corresponding to the class to which the outside air pressure detected by the air pressure sensor belongs and the temperature detected by the temperature sensor and outputting a voltage signal corresponding to the determined control voltage value to the driving circuit of the cooling fan.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
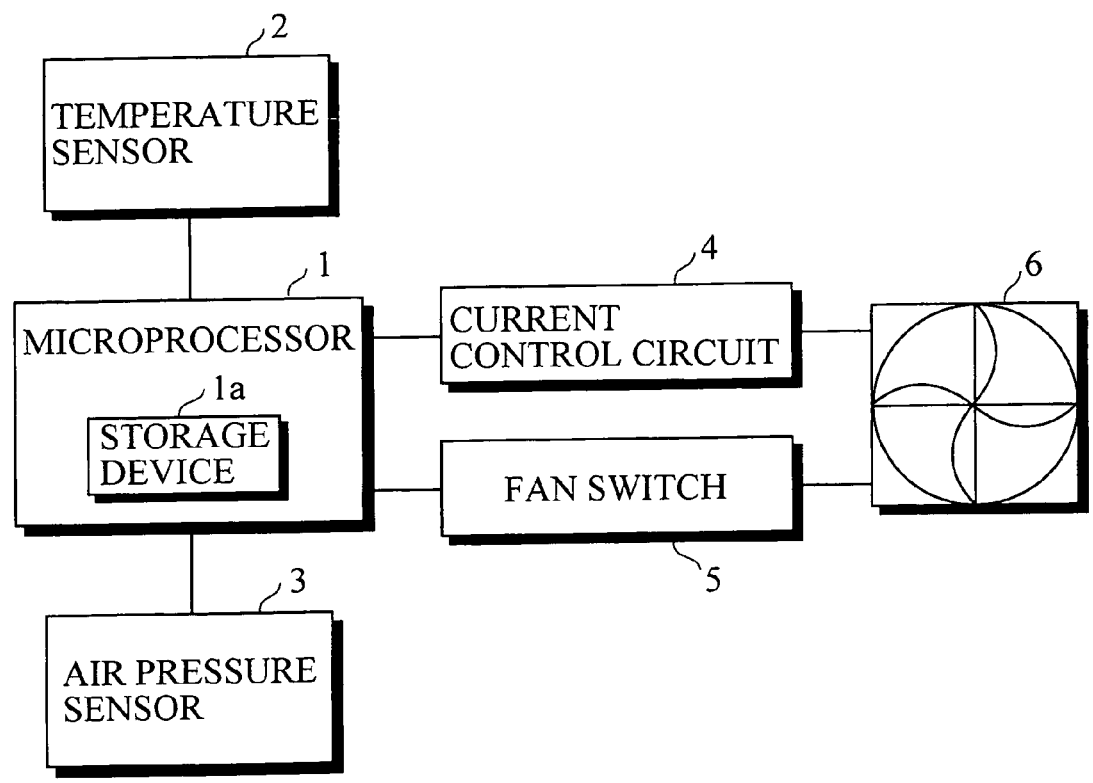
FIG. 1 is a block diagram showing the configuration of a control circuit in a cooling fan provided in a liquid crystal projector.

Referring now to the drawings, an embodiment of the present invention will be described.

FIG. 1 illustrates the configuration of a control circuit of a cooling fan provided in a liquid crystal projector.

Reference numeral 1 denotes a microprocessor. The microprocessor 1 comprises a storage device 1a. Reference numeral 2 denotes a temperature sensor arranged in a casing of the liquid crystal projector. Reference numeral 3 denotes an air pressure sensor for detecting outside air pressure.

Reference numeral 6 denotes a cooling fan which is arranged inside the casing of the liquid crystal projector and the number of revolutions of which is changed by a driving current. Reference numeral 4 denotes a current control circuit (a driving circuit) for controlling the driving current for the cooling fan 6 on the basis of a control voltage from the microprocessor 1. Reference numeral 5 denotes a fan switch for turning the cooling fan 6 on or off.

In this example, the outside air pressure is divided into three classes, high, middle and low classes, and a detected temperature-control voltage table representing the relationship between a temperature detected by the temperature sensor 2 and the value of a control voltage for the current control circuit 6 is prepared for each of the classes. The storage device 1a stores the three types of detected temperature-control voltage tables.

Figure 2:
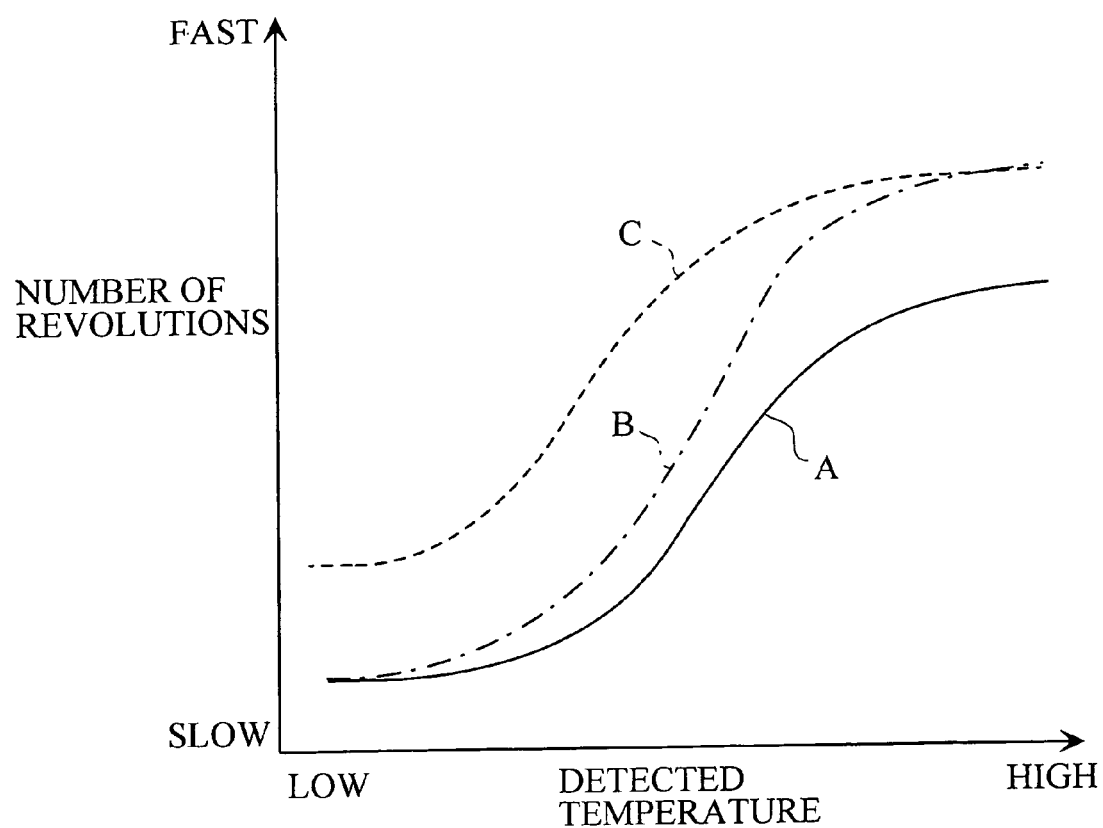
FIG. 2 is a graph showing the relationship between the temperature and the number of revolutions which is represented by each of three types of detected temperature-control voltage tables.

FIG. 2 illustrates the relationship between the detected temperature and the number of revolutions of the cooling fan which is represented by each of the three types of detected temperature-control voltage tables.

A curve A shown in FIG. 2 represents the relationship between the detected temperature and the number of revolutions of the cooling fan which is represented by the detected temperature-control voltage table in a case where outside air pressure is high, that is, for flatlands.

A curve C shown in FIG. 2 represents the relationship between the detected temperature and the number of revolutions of the cooling fan which is represented by the detected temperature-control voltage table in a case where outside air pressure is low, that is, for highlands.

A curve B shown in FIG. 2 represents the relationship between the detected temperature and the number of revolutions of the cooling fan which is represented by the detected temperature-control voltage table in a case where outside air pressure is middle.

Figure 3:
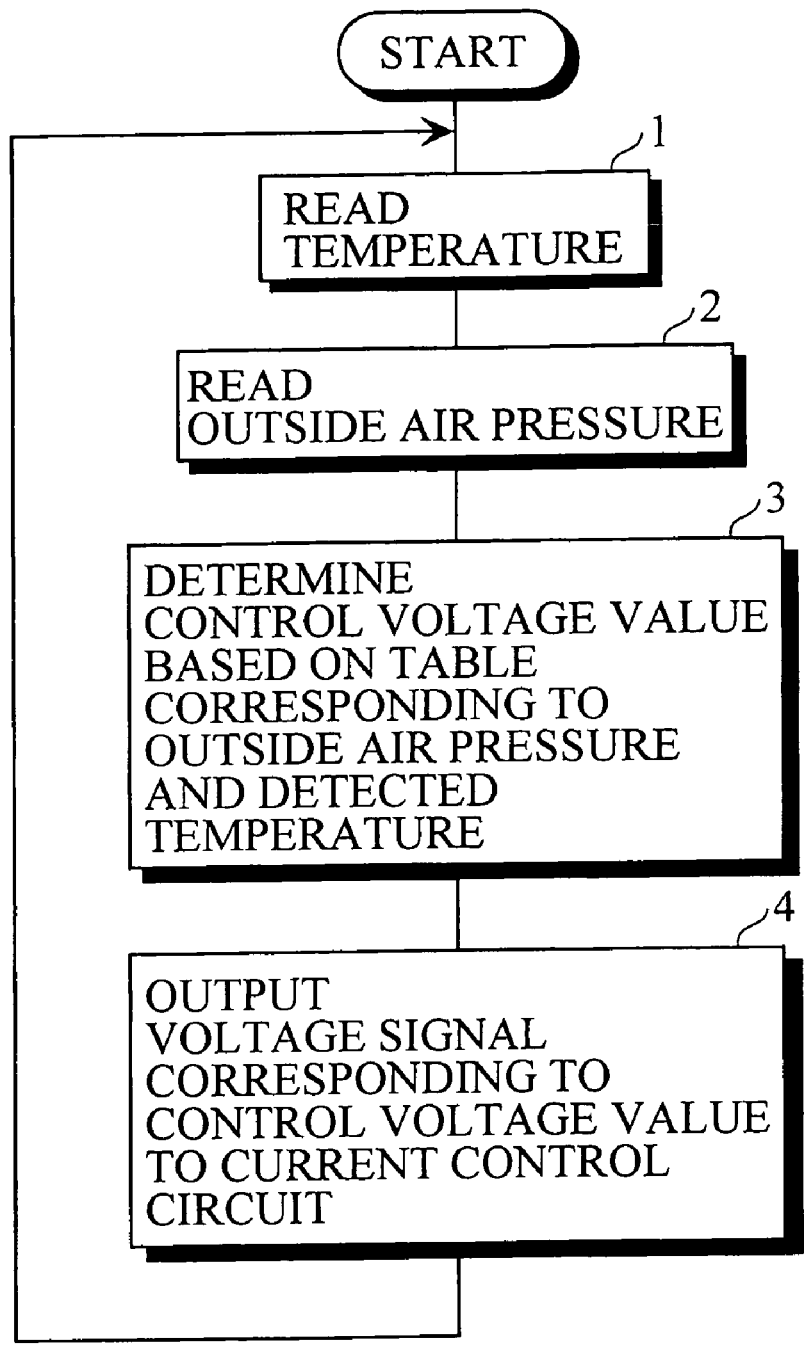
FIG. 3 is a flow chart showing the procedure for fan control processing by a microprocessor 1.

FIG. 3 shows the procedure for fan control processing by the microprocessor 1.

The microprocessor 1 carries out the following control in a state where the fan switch 5 is turned on.

A temperature detected by the temperature sensor 2 is read (step 1). Outside air pressure detected by the air pressure sensor 3 is read (step 2). The value of a control voltage is determined from the temperature-control voltage table corresponding to the class to which the detected outside air pressure belongs (step 3), and a voltage signal corresponding to the determined control voltage value is outputted to the current control circuit 4 (step 4). The program is returned to the step 1.

According to the above-mentioned embodiment, suitable cooling fan control is automatically carried out depending on air pressure in an area where the liquid crystal projector is employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a liquid crystal projector provided with a cooling fan, the liquid crystal projector comprising:
    a temperature sensor for detecting the internal temperature of the liquid crystal projector;
    an air pressure sensor for detecting outside air pressure;
    a driving circuit of the cooling fan,
    storage means for storing a control table representing the relationship between the temperature detected by the temperature sensor and the value of a control voltage for the driving circuit of the cooling fan for each of a plurality of classes into which the outside air pressure is divided; and
    means for determining the value of the control voltage for the driving circuit of the cooling fan on the basis of the control table corresponding to the class to which the outside air pressure detected by the air pressure sensor belongs and the temperature detected by the temperature sensor and outputting a voltage signal corresponding to the determined control voltage value to the driving circuit of the cooling fan.

2. In a liquid crystal projector provided with a cooling fan, the liquid crystal projector comprising:
    a temperature sensor for detecting the internal temperature of the liquid crystal projector;
    an air pressure sensor for detecting outside air pressure;
    a driving circuit of the cooling fan;
    a storage device for storing a control table representing the relationship between the temperature detected by the temperature sensor and the value of a control voltage for the driving circuit of the cooling fan for each of a plurality of classes into which the outside air pressure is divided; and
    a circuit for determining the value of the control voltage for the driving circuit of the cooling fan on the basis of the control table corresponding to the class to which the outside air pressure detected by the air pressure sensor belongs and the temperature detected by the temperature sensor and outputting a voltage signal corresponding to the determined control voltage value to the driving circuit of the cooling fan.

* * * * *